(12) United States Patent
Chi (10) Patent No.: US 6,942,080 B2
(45) Date of Patent: Sep. 13, 2005

(54) ELECTRICAL APPLIANCE HAVING A WIRE WINDING DEVICE

(75) Inventor: Shang-Fei Chi, Fujian (CN)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/728,287

(22) Filed: Dec. 4, 2003

(65) Prior Publication Data

US 2005/0121276 A1 Jun. 9, 2005

(51) Int. Cl.[7] .............................................. H02G 1/00
(52) U.S. Cl. ................ 191/12.4; 191/12 S; 191/12.2 R
(58) Field of Search ........................... 191/12 S, 12 R, 191/14.4, 12.2 R, 12.4, 12.2 A; 439/109

(56) References Cited

U.S. PATENT DOCUMENTS 2,063,234 A * 12/1936 Ehrlich .................. 191/12.2 R
2,514,628 A * 7/1950 Edmundo .................. 119/12.4
6,480,611 B2 * 11/2002 Hashimoto et al. ......... 381/371

* cited by examiner

Primary Examiner—Mark T. Le
(74) Attorney, Agent, or Firm—Ohlandt, Greeley, Ruggiero & Perle, L.L.P.

(57) ABSTRACT

An electrical appliance includes a housing, an electric unit mounted within the housing, a winding unit mounted within the housing and including a reel member, an electrical wire connected electrically to the electric unit and wound around the reel member, and a latch unit engaging releasably the reel member to prevent the reel member from rotation in a winding direction of the reel member. The electrical wire has one end provided with a plug portion. The housing has at least one insert hole proximate to the latch unit for extension of the plug portion therethrough so as to press and disengage the latch unit from the reel member, thereby permitting the winding unit to wind the electrical wire.

8 Claims, 8 Drawing Sheets

ELECTRICAL APPLIANCE HAVING A WIRE WINDING DEVICE

BACKGROUND OF THE INVENTION

1. Field of the Invention

The invention relates to an electrical appliance, more particularly to an electrical appliance having a wire winding device, and to a method of winding an electrical wire of the electrical appliance.

2. Description of the Related Art

Figure 1:
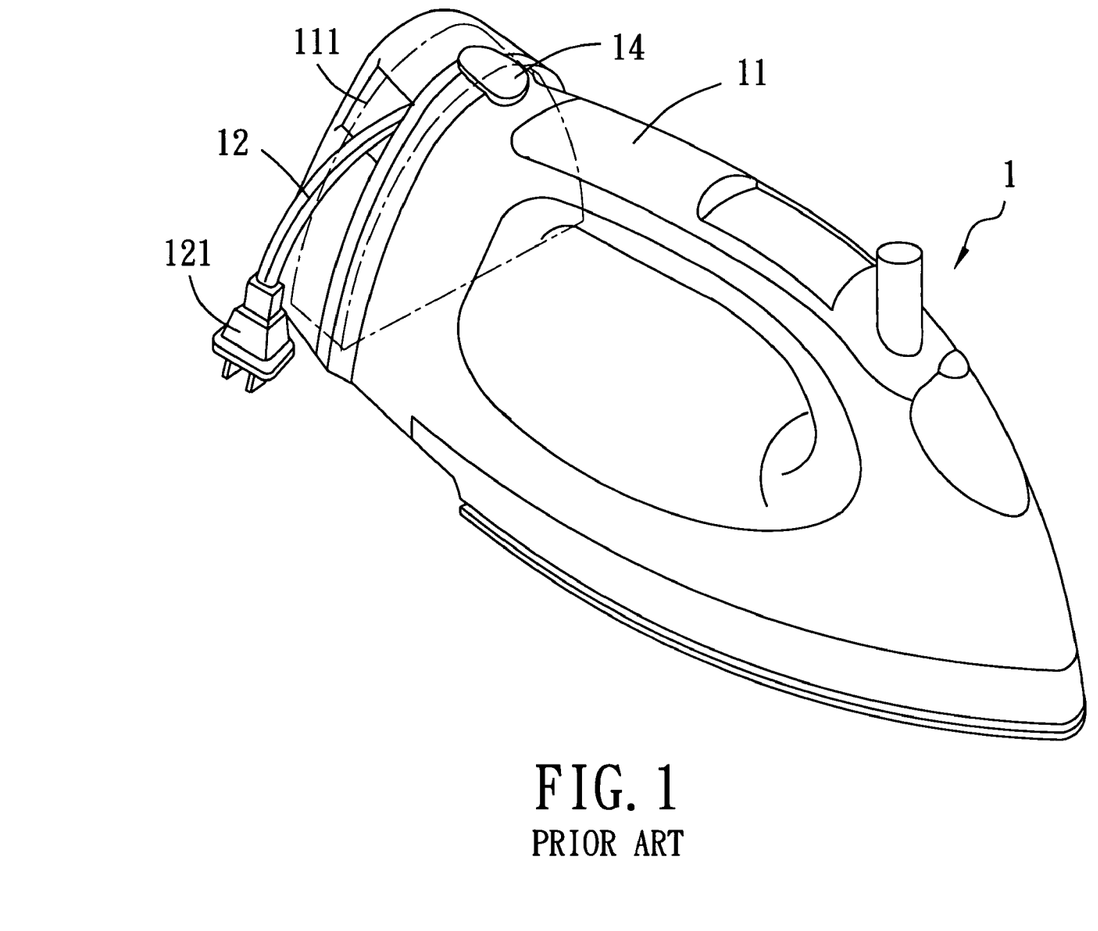
FIG. 1 is a perspective view of a conventional electrical appliance having a wire winding device.

Referring to FIG. 1, a conventional electrical appliance 1 with a wire winding device includes a housing 11, an electrical wire 12 having a plug portion 121 at one end, a winding unit (not shown) disposed within the housing 11 for winding and unwinding the electrical wire 12, and a control knob 14 disposed on the housing 11 for controlling rotation of the winding unit. The housing 11 is formed with a through hole 111 for extension of the electrical wire 12 therethrough. The through hole 111 has a diameter smaller than that of the plug portion 121 so that the plug portion 121 protrudes out of the through hole 111.

To use the conventional electrical appliance 1, a substantial length of the electrical wire 12 is pulled out of the housing 11 through the through hole 111 so as to connect the plug portion 121 with a power supply. To store the electrical appliance 1 after use, the control knob 14 is pressed so as to activate the wire winding device, which in turn, winds the electrical wire 12 until the plug portion 121 abuts against the through hole 111.

However, when the user forgets to unplug the plug portion 121 of the electrical wire 12 and proceeds with pressing the control knob 14, the electrical wire 12 will be subjected to a sudden pulling force. This can damage the electrical appliance 1. Thus, improvement on the wire winding device is desirable.

SUMMARY OF THE INVENTION

Therefore, the main object of the present invention is to provide an electrical appliance having a wire winding device that is safe to use.

Another object of the present invention is to provide a method for winding an electrical wire of the electrical appliance.

According to one aspect of this invention, a wire winding device for an electrical wire of an electrical appliance comprises a housing, a winding unit, and a latch unit. The electrical wire has one end provided with a plug portion. The winding unit is mounted within the housing, and includes a reel member adapted for winding and unwinding the electrical wire. The latch unit is disposed movably within the housing, and engages releasably the reel member to prevent the reel member from rotation in a winding direction of the reel member. The housing has at least one insert hole proximate to the latch unit for extension of the plug portion therethrough so as to press and disengage the latch unit from the reel member, thereby permitting the winding unit to wind the electrical wire.

According to another aspect of this invention, an electrical appliance comprises a housing, an electric unit mounted within the housing, a winding unit, an electrical wire, and a latch unit. The winding unit is mounted within the housing, and includes a reel member. The electrical wire is connected electrically to the electric unit, and is wound around the reel member. The electrical wire has one end provided with a plug portion. The latch unit is disposed movably within the housing, and engages releasably the reel member to prevent the reel member from rotation in a winding direction of the reel member. The housing has at least one insert hole proximate to the latch unit for extension of the plug portion therethrough so as to press and disengage the latch unit from the reel member, thereby permitting the winding unit to wind the electrical wire.

According to a further aspect of this invention, a method for winding an electrical wire of an electrical appliance, which includes a housing, a reel member mounted within the housing to wind up the electrical wire, and a latch unit to engage and prevent the reel member from rotation in a winding direction of the reel member, the electrical wire having a plug portion at one end, comprises the steps of providing an insert hole in the housing, and inserting the plug portion into the insert hole to press the latch unit so as to disengage the latch unit from the reel member, thereby permitting the reel member to wind the electrical wire.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
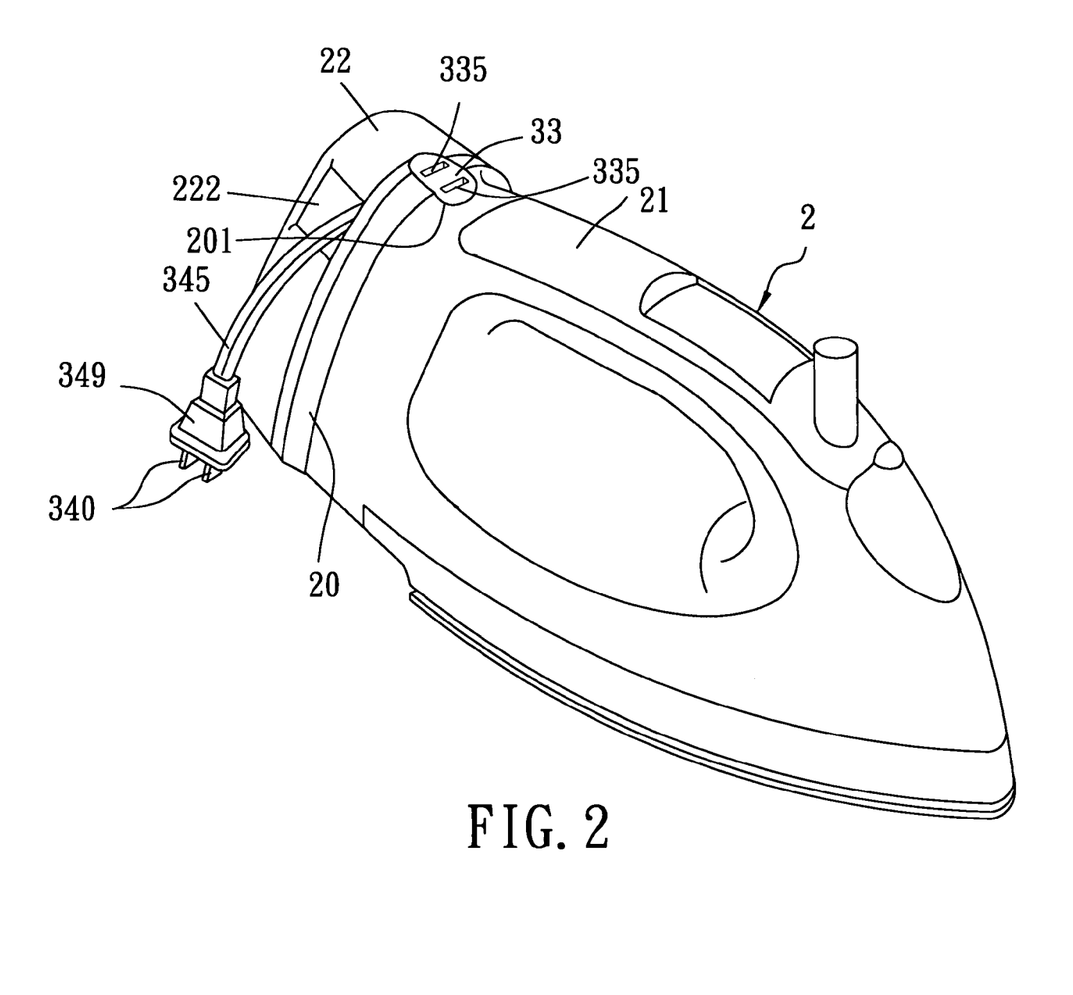
FIG. 2 is a perspective view of the first preferred embodiment of an electrical appliance according to the present invention.
Figure 3:
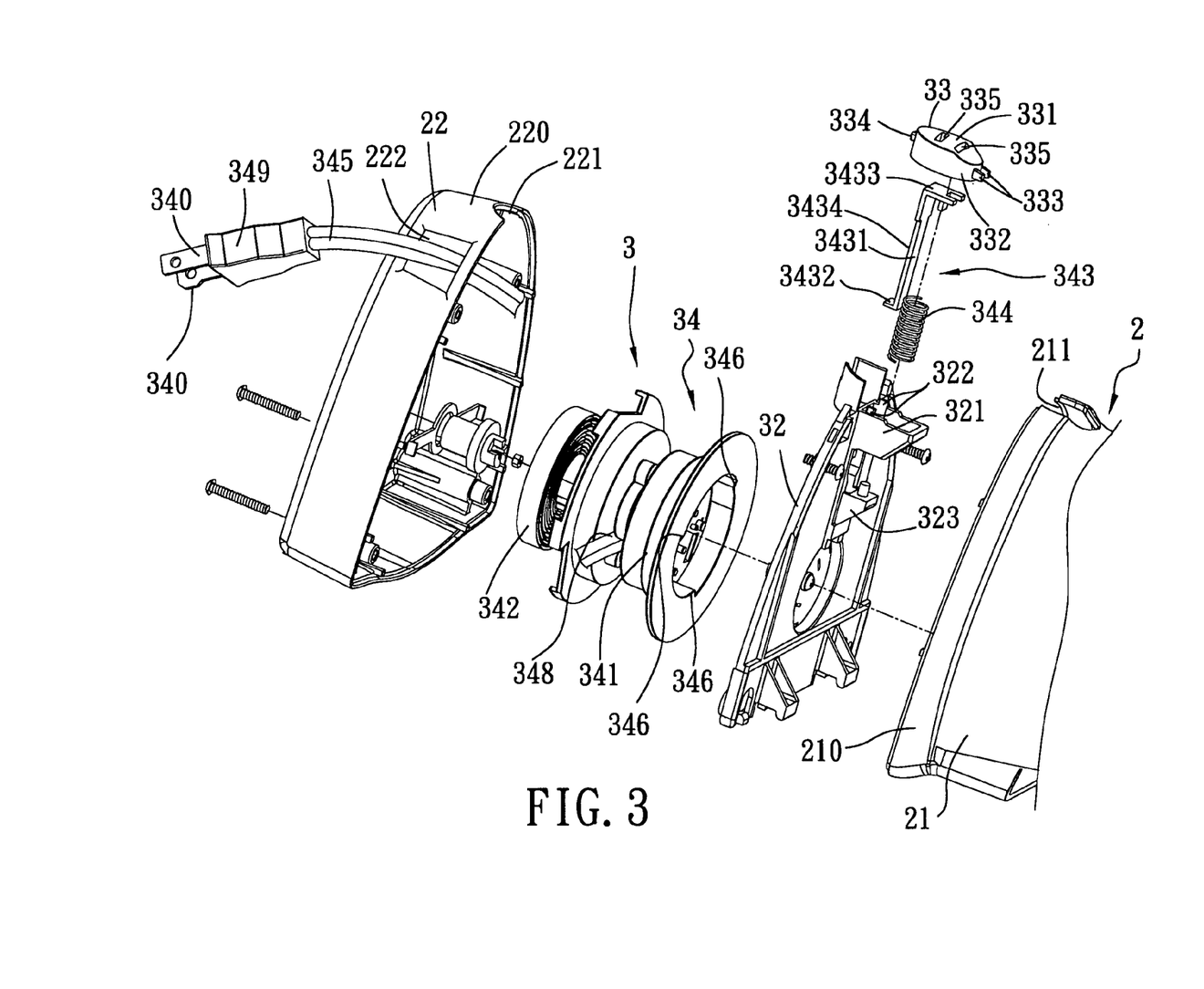
FIG. 3 is a fragmentary exploded perspective view of the first preferred embodiment.
Figure 4:
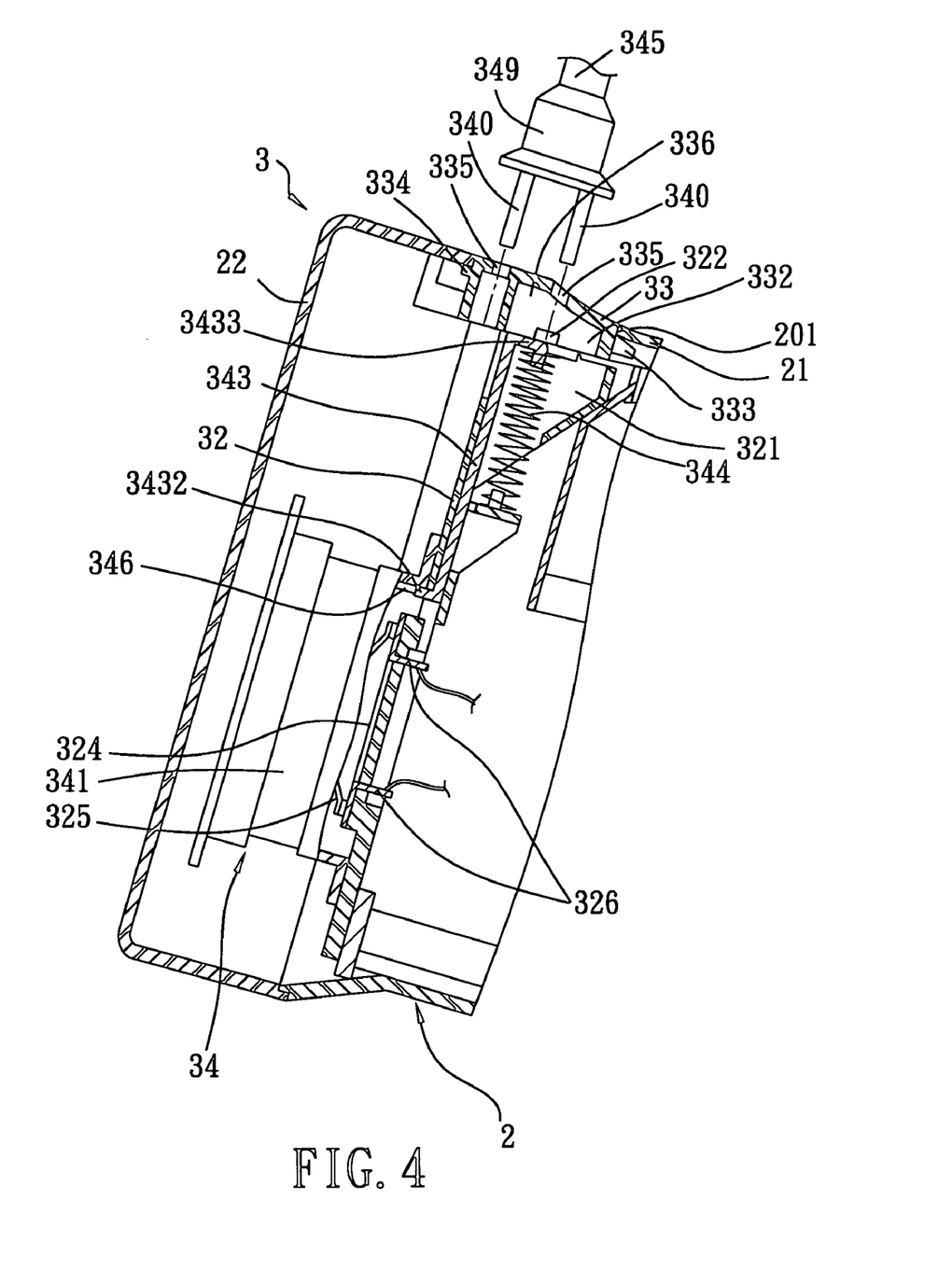
FIG. 4 is a fragmentary sectional view of the first preferred embodiment.

Referring to FIGS. 2 to 4, the first preferred embodiment of an electrical appliance according to the present invention is shown to comprise a main housing 2 enclosing an electric unit (not shown), and a wire winding device 3. In this embodiment, the electrical appliance is exemplified as a press iron. However, other electrical appliances, such as a vacuum cleaner, a coffee maker, cooking appliance, etc., are also applicable in the present invention.

The main housing 2 has a front housing 21 with a front wall 210, a rear housing 22 with a rear wall 220 that cooperates with the front wall 210 to form an outer wall 20 (see FIG. 2), and a partition plate 32. The front wall 210 has a notch portion 211 (see FIG. 3) formed on a top periphery thereof and extending frontwardly. The rear wall 220 has a notch portion 221 (see FIG. 3) formed on a top periphery thereof and extending rearwardly. The notch portions 211, 221 of the front and rear walls 210, 220 cooperate to define a cutout portion 201 (see FIGS. 2 and 4). A through hole 222 is formed in the side portion of the rear housing 22. The partition plate 32 is screwed to the rear housing 22, and has a support portion 321, two protrusions 322 projecting upwardly from the support portion 321, and a spring seat 323 proximate to the support portion 321. The rear housing 22 is screwed to the front housing 21 so that the partition plate 32 is disposed between the front and rear housings 21, 22.

A socket member 33 is disposed within the outer wall 20, and is fitted within the cutout portion 201. The socket member 33 has a face wall 331 flush with the outer wall 20, a peripheral wall 332 extending laterally and inwardly from the face wall 331, two first pins 333 extending outwardly from the peripheral wall 332 in a first forward direction and abutting against an inner wall surface of the front wall 210 of the front housing 21, a second pin 334 extending outwardly from the peripheral wall 332 in a second rearward direction opposite to the first forward direction and abutting against an inner wall surface of the rear wall 220 of the rear housing 22, and a pair of insert holes 335 formed in the face wall 331. The face wall 331 and the peripheral wall 332 cooperate to define a receiving space 336 (see FIG. 4). Through the first and second pins 333, 334 which abut respectively against the inner wall surfaces of the front and rear walls 210, 220 of the front and rear housings 21, 22, and through the engagement of the protrusions 322 and the peripheral wall 332 of the socket member 33, the socket member 33 is secured fixedly between the front and rear walls 210, 220 of the front and rear housings 21, 22.

The electric unit (not shown) of the electrical appliance is mounted within the front housing 21. Since the importance of the present invention lies on the wire winding device 3, a detailed description of the construction of the electric unit is dispensed herewith for the sake of brevity.

The wire winding device 3 is mounted within the main housing 2, and is connected electrically to the electric unit in a known manner. The wire winding device 3 includes a winding unit 34, an electrical wire 345, and a latch unit 343. The winding unit 34 is mounted within the rear housing 22, and includes a reel member 341 mounted rotatably on the rear housing 22 in a conventional manner, and a spiral spring member 342 disposed on the reel member 341 to restore the reel member 341 after rotation. The reel member 341 has a plurality of angularly spaced-apart retention members 346 formed in an inner surface thereof. The electrical wire 345 is wound around the reel member 341, and has a wire end portion 348 connected to the reel member 341, and a plug portion 349 opposite to the wire end portion 348 and having two prongs 340. The plug portion 349 extends externally of the rear housing 22 through the through hole 222 in the rear housing 22.

A conductive metal ring 324 (see FIGS. 4 and 5) is mounted on the partition plate 32. The metal ring 324 includes a pair of poles 326 (see FIGS. 4 and 5) for electrical connection with the electric unit (not shown) of the electrical appliance in a conventional manner. Two conductive spring plates 325 (see FIGS. 4 and 5) are mounted on the reel member 341 and contact the metal ring 324 for electrical connection between the electrical wire 345 and the metal ring 324 in a conventional manner.

The latch unit 343 is mounted movably on the partition plate 32, and is located below the insert holes 335 in the socket member 33. The latch unit 343 includes a latch member 3431 and a biasing unit 344. The latch member 3431 permits the reel member 341 to rotate freely in its unwinding direction in a known manner. The latch member 3431 has an engaging end 3432 engaged releasably with one of the retention members 346 of the reel member 341, a press end 3433 opposite to the engaging end 3432 and disposed proximate to the insert holes 335, and an intermediate part 3434 interconnecting the engaging end 3432 and the press end 3433. The engaging end 3432 and the press end 3433 project respectively and transversely from two opposite ends of the intermediate part 3434 in opposite directions. The engaging end 3432 extends toward the reel member 341, whereas the press end 3433 extends below the insert holes 335. The biasing unit 344 is disposed between the press end 3433 of the latch member 3431 and the spring seat 323 of the partition plate 32 so as to bias the press end 3433 toward the insert holes 335. As such, the engaging end 3432 of the latch member 3431 can engage one of the retention members 346 of the reel member 341 so that the reel member 341 is prevented from rotation in its winding direction.

It should be noted that the wire winding device 3 is not limited to be mounted on the rear housing 22, and the through hole 222 is not limited to be formed in the side portion of the rear housing 22. The positions of the wire winding device 3 and the through hole 222 can be altered according to the type of the electrical appliance.

Figure 5:
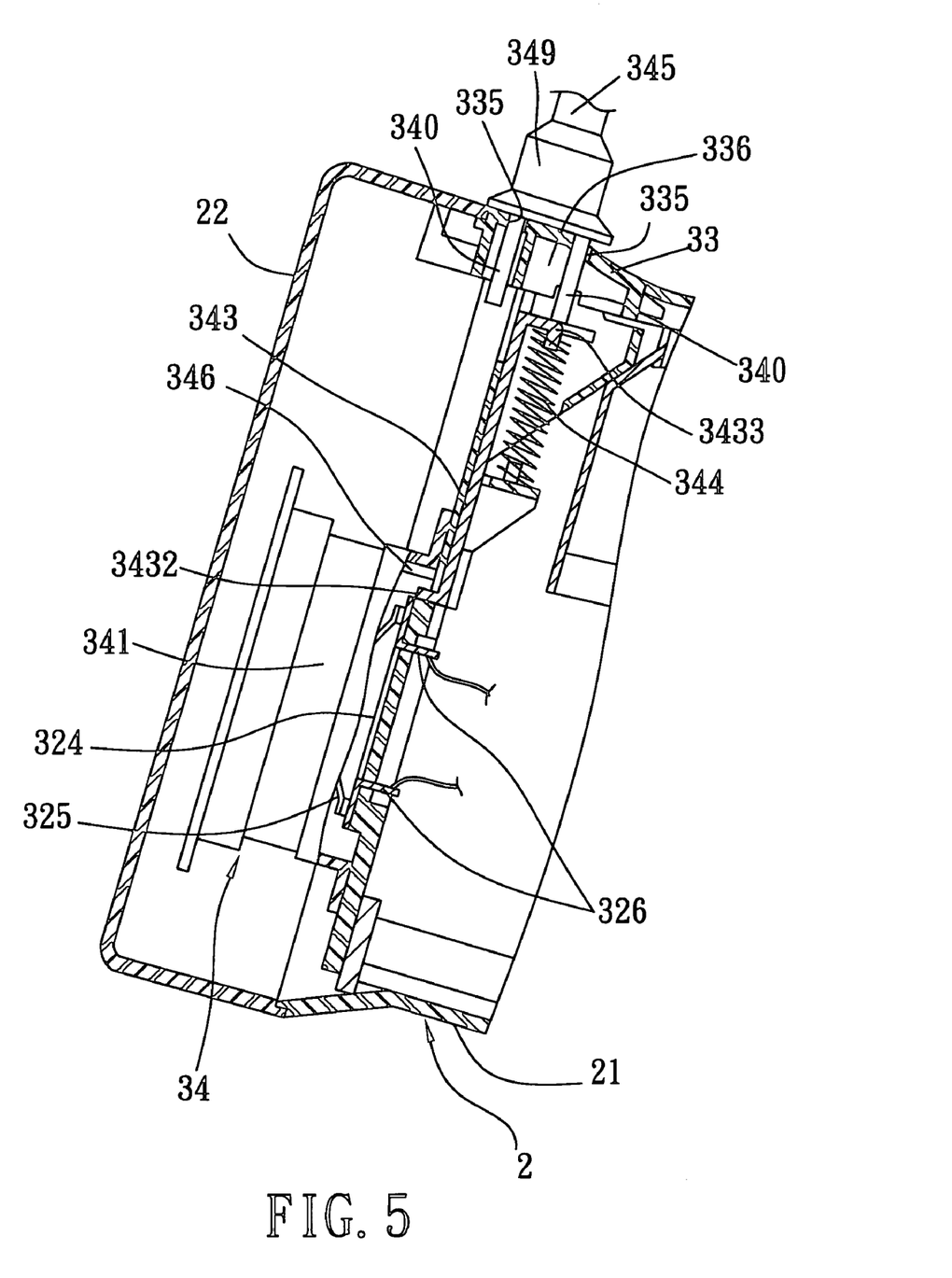
FIG. 5 is a view substantially similar to FIG. 4, but with a plug portion of an electrical wire inserted into a socket member.
Figure 6:
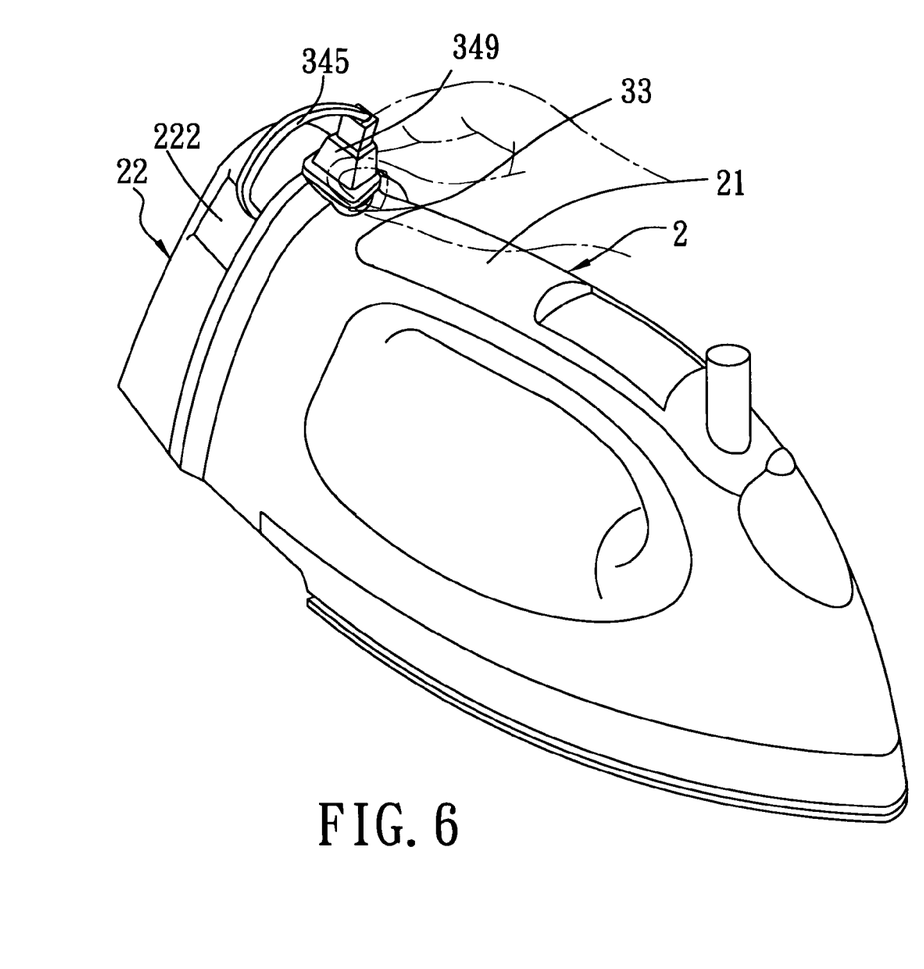
FIG. 6 is a perspective view of the first preferred embodiment, illustrating the plug portion of the electrical wire being inserted into the socket member.

To use the electrical appliance of the present invention, a substantial length of the electrical wire 345 is pulled out from the reel member 341 through the through hole 222 so as to connect the plug portion 349 with a power supply (not shown). When the electrical wire 345 is pulled out from the reel member 341, the reel member 341 is rotated at the same time in a direction so that the spiral spring member 342 can store a restoring force. The method for winding the electrical wire 345 back into the reel member 341 using the first preferred embodiment of the present invention includes the following steps:

1. The plug portion 349 of the electrical wire 345 is removed from the power supply, and is inserted into the socket member 33 by passing respectively the prongs 340 of the plug portion 349 into the insert holes 335 in the socket member 33, as best illustrated in FIGS. 5 and 6. The prongs 340 of the plug portion 349 are received in the receiving space 336 at this time.

2. When the plug portion 349 is pressed by a hand of the user, one of the prongs 340 of the plug portion 349 presses the press end 3433 of the latch member 3431 to move downwardly, thereby causing the engaging end 3432 of the latch member 3431 to disengage from the corresponding retention member 346 of the reel member 341, as best shown in FIG. 5.

3. As soon as the engaging end 3432 of the latch member 3431 disengages from the corresponding retention member 346 of the reel member 341, the reel member 341 rotates, and the electrical wire 345 is wound around the reel member 341.

4. The hand of the user is removed from the plug portion 349 after winding of the electrical wire 345.

Figure 7:
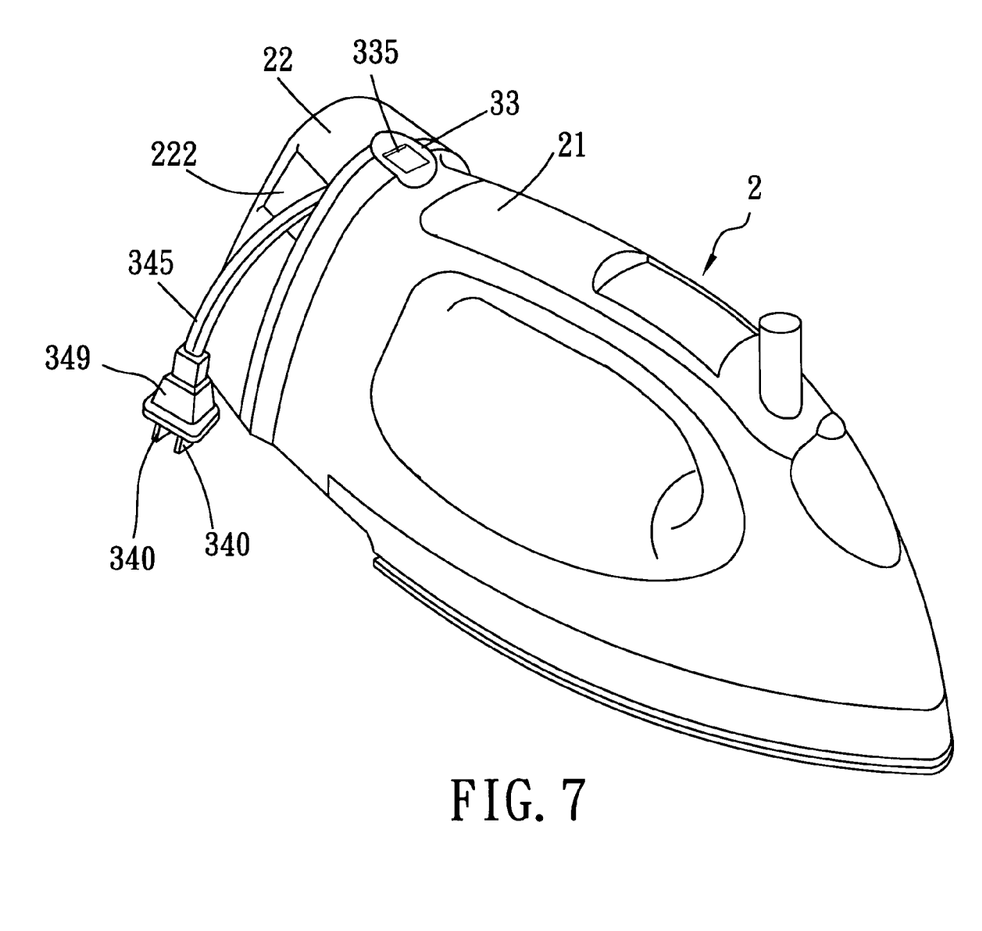
FIG. 7 is a perspective view of the second preferred embodiment of an electrical appliance according to the present invention.

Referring to FIG. 7, the second preferred embodiment of an electrical appliance according to the present invention is shown to be substantially similar to the first preferred embodiment. However, in this embodiment, the socket member 33 is designed with only one insert hole 335. The insert hole 335 has a dimension that is large enough to accommodate insertion of the prongs 340 of the plug portion 349 of the electrical wire 345 therethrough.

Figure 8:
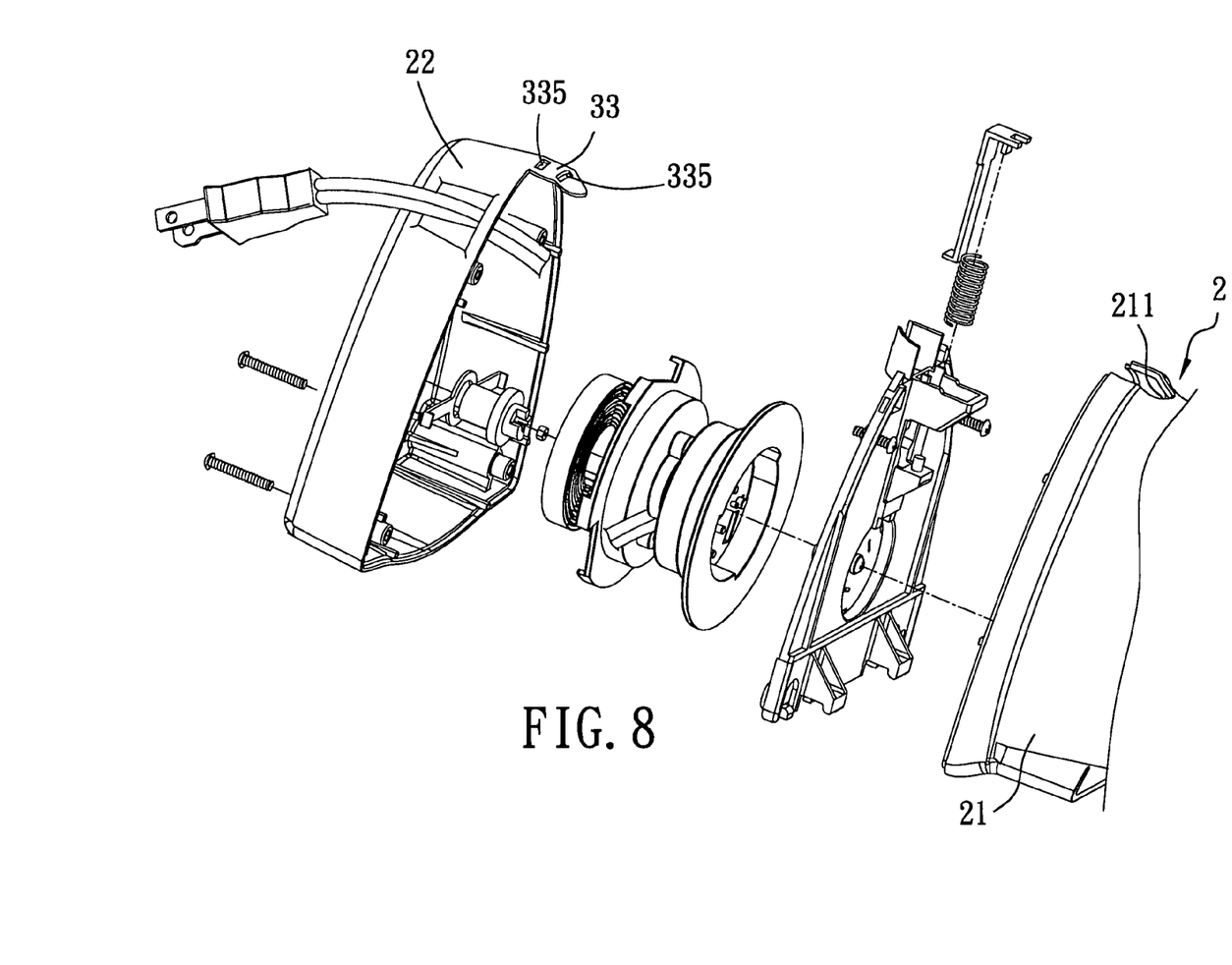
FIG. 8 is a fragmentary exploded perspective view of the third preferred embodiment of an electrical appliance according to the present invention.

Referring to FIG. 8, the third preferred embodiment of an electrical appliance according to the present invention is shown to be substantially similar to the first preferred embodiment. However, in this embodiment, the socket member 33 is formed as one piece with the rear wall 220 of the rear housing 22, and extends outwardly and frontwardly from the rear wall 220 of the rear housing 22. The socket member 33 is formed with two insert holes 335.

From the aforementioned description of the preferred embodiments of the electrical appliance of the present invention, it is apparent that insertion of he prongs 340 of the plug portion 349 into the insert holes 335 in the socket member 33 can activate the winding unit 34 to wind the electrical wire 345. Thus, it is necessary for the user to unplug the plug portion 349 of the electrical wire 345 from the outlet of the power supply before the electrical wire 345 is wound up, thereby preventing the electrical wire 345 from being subjected to a sudden pulling force when the user forgets to unplug the electrical wire 345.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electrical appliance comprising:
   a housing;
   an electric unit mounted within said housing;
   a winding unit mounted within said housing and including a reel member;
   an electrical wire connected electrically to said electric unit and wound around said reel member, said electrical wire having one end provided with a plug portion; and
   a latch unit disposed movably within said housing, said latch unit engaging releasably said reel member to prevent said reel member from rotation in a winding direction of said reel member;
   wherein said housing has at least one insert hole proximate to said latch unit for extension of the plug portion therethrough so as to press and disengage said latch unit from said reel member, thereby permitting said winding unit to wind the electrical wire,
   wherein said housing further includes an outer wall and a socket member disposed within said outer wall, said insert hole being formed in said socket member,
   wherein said outer wall has a cutout portion, said socket member being fitted within said cutout portion, and
   wherein said socket member has a face wall flush with said outer wall, and a peripheral wall extending laterally and inwardly from said face wall, said face wall and said peripheral wall cooperating to define a receiving space, said plug portion being received in said receiving space.

2. The wire winding device as claimed in claim 1, wherein said latch unit includes a latch member having an engaging end engaged releasably with said reel member, and a press end opposite to said engaging end and proximate to said insert hole, and a biasing unit that biases said press end toward said insert hole so as to cause said engaging end to engage said reel member.

3. The wire winding device as claimed in claim 2, wherein said latch member further includes an intermediate part interconnecting said engaging end and said press end, said press and engaging ends projecting respectively and transversely
   from two opposite ends of said intermediate part in opposite directions, said engaging end extending toward said reel member, said press end extending below said insert hole and being biased by said biasing unit toward said insert hole.

4. The electrical appliance as claimed in claim 1, wherein said socket member is formed as one piece with said outer wall.

5. The electrical appliance as claimed in claim 1, wherein said socket member further includes two first pins extending outwardly from said peripheral wall in a first direction and a second pin extending outwardly from said peripheral wall in a second direction opposite to said first direction said first and second pins engaging said outer wall.

6. The electrical appliance as claimed in claim 1, wherein said insert hole is formed in said face wall.

7. The electrical appliance as claimed in claim 1, wherein a pair of said insert holes are formed in said socket member.

8. The wire winding device as claimed in claim 1, wherein said plug portion extends externally of the electrical appliance.

* * * * *